(12) United States Patent
Akimori et al.

(10) Patent No.: US 6,521,317 B2
(45) Date of Patent: Feb. 18, 2003

(54) OPTICAL RECORDING MEDIUM

(75) Inventors: Toshihiro Akimori, Miyagi (JP); Sohmei Endoh, Miyagi (JP); Manabu Satoh, Miyagi (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 09/780,524

(22) Filed: Feb. 9, 2001

(65) Prior Publication Data

US 2002/0004119 A1 Jan. 10, 2002

(30) Foreign Application Priority Data

Feb. 10, 2000 (JP) .................................... 2000-038252
Sep. 4, 2000 (JP) .................................... 2000-267805
Sep. 4, 2000 (JP) .................................... 2000-267808

(51) Int. Cl.$^7$ ................................................. B32B 3/02
(52) U.S. Cl. ................ 428/64.1; 428/64.8; 430/270.14; 430/270.2
(58) Field of Search ................ 428/64.1, 64.4, 428/64.8, 913; 430/270.14, 270.18, 270.19, 270.2, 495.1

(56) References Cited

U.S. PATENT DOCUMENTS

| 5,696,758 A | * 12/1997 | Yanaguimachi | .......... 369/275.4 |
| 5,976,658 A | * 11/1999 | Tomizawa | ................. 428/64.1 |
| 5,998,094 A | * 12/1999 | Ishida | .................... 430/270.19 |

FOREIGN PATENT DOCUMENTS

| EP | 0840307 | 6/1998 |
| EP | 0895230 | 2/1999 |
| EP | 0905202 | 3/1999 |
| EP | 0974959 | 1/2000 |

* cited by examiner

Primary Examiner—Elizabeth Mulvaney
(74) Attorney, Agent, or Firm—Sonnenschein, Nath & Rosenthal

(57) ABSTRACT

The present invention enables to realize a high recording density while suppressing the wobble signal jitter component to a sufficiently low value for practical use, thereby enabling to perform information recording/reproducing in a stable manner. The recording track has a track pitch set to 1.3 micrometers or below and the recording layer is formed by a recording material containing a dye having a characteristic appropriate to suppress the wobble signal jitter component to a low value.

6 Claims, 1 Drawing Sheet

OPTICAL RECORDING MEDIUM

RELATED APPLICATION DATA

The present application claims priority to Japanese Applications No. P2000-038252 filed Feb. 10, 2000, No. P2000-267805 filed Sep. 4, 2000 and No. P2000-267808 filed Sep. 4, 2000, which applications are incorporated herein by reference to the extent permitted by law.

BACKGROUND OF THE INVENTION

1. Field of the Invention

The present invention relates to an optical recording medium having a recording track and a wobbling groove formed along the recording track in which a signal is recorded as a reflection ratio change of a recording material based on an organic dye while reproducing a wobble signal from the wobbling groove.

2. Description of the Prior Art

As a recording medium for storing information, an optical disc has been used in practice for optically recording/reproducing information. In such an optical disc, information is recorded/reproduced with a head in a non-contact state and according no problems arise such as abrasion or deterioration of the recording medium. For this, the optical disc is now widely used as a recording medium having a high reliability.

Among such optical discs, a so-called heat mode optical disc has been developed in which a user can write information by utilizing a heat of the light applied to the optical disc. As an example, an optical disc of a so-called pit formation type is now used in practice. A recording light such as a laser light is applied to the optical disc to cause a heat which forms a small pit in the recording material, thereby recording information.

In this pit formation type optical disc, generally, the recording material used is a chalcogen material containing tellurium (Te) as a main content or an organic dye-based material. These recording materials exhibit a high sensitivity and a low noise and are little deteriorated by lapse of time. Recently, especially, the organic dye-based material is widely used.

As an optical disc using an organic dye-based material as the recording medium, an optical disc (hereinafter, referred to as a CD-R) used for a so-called compact disc recordable system is now used in practice.

The CD-R has a wobbling groove formed along the recording track. Here, the wobbling groove is a guide groove formed with a predetermined meander so that the guide groove itself has a signal component. It should be noted that the guide groove is a groove formed along the recording track so as to facilitate tracking servo by, for example, the push-pull method.

In the CD-R, a sector information containing an absolute time information which has been subjected to FM modulation is recorded as a signal (wobble signal) by this wobbling groove (ATIP: Absolute Time In Pregroove). That is, in the compact disc recordable system using the CD-R as the recording medium, a recording/reproducing light spot focused on the wobbling groove detects a wobble signal using, for example, 22.05 kHz as a carrier and detects a data string containing an absolute time information by FM demodulation of the signal.

In this method recording as a wobble signal a sector information containing an absolute time information, it is possible to continuously record signals, which is advantageous for compatibility with a ROM optical disc in which signals are continuously recorded. That is, in the method in which an address information is arranged at a head of each sector, an absolute time information and a recording signal are recorded by time division method, signals recorded become discontinuous, causing difficulty for compatibility with a ROM optical disc in which signals are continuously recorded. In contrast to this, in the method in which a sector information containing an absolute time information is recorded as a wobble signal, it is easy to obtain compatibility with a ROM optical disc.

In the aforementioned optical discs, various trials are now performed to increase the recording density so as to record more information within the existing outer diameter of the normalized optical discs. For example, in the aforementioned CD-R, an attempt is being made to increase the recording density so as to realize a recording capacity equal to or above 1.0 GB (gigabytes).

When considering the higher recording density, it is effective to reduce the track pitch as an interval between adjacent recording tracks. However, as the track pitch is reduced, more information leaks from adjacent recording tracks, increasing a signal jitter component.

Moreover, in an optical disc having a wobbling groove along the recording track in which an absolute time information or the like is recorded as a wobble signal, if the track pitch of the recording track is reduced, the more wobble signal leaks from the adjacent wobbling grooves, increasing the wobble signal jitter component. When the wobble signal jitter component is significantly increased, it becomes difficult to assure to recognize the time information and the like contained in the wobble signal, disabling to obtain stable information recording/reproducing.

In the optical disc using an organic dye-based material as the recording material, the wobble signal jitter characteristic greatly depends on the state of the organic dye-based recording material filled in the wobbling groove. In other words, the wobble signal jitter characteristic is greatly changed by the viscosity and wettability of a paint liquid applied on the substrate for forming the recording layer.

The viscosity and the wettability are determined by the feature inherent to the dye used. Accordingly, when the recording material can use a dye having a feature appropriate to suppress the wobble signal jitter component, even in the optical disc having a reduced track pitch to obtain a higher recording density, it is possible to suppress the wobble signal jitter component to a sufficiently low value practically.

SUMMARY OF THE INVENTION

It is therefore an object of the present invention to provide an optical recording medium realizing a high recording density while suppressing a wobble signal jitter component to a sufficiently low value so as to obtain stable recording/reproducing of information.

The optical recording medium according to the present invention is an optical recording medium having a recording track in which a signal is recorded as a reflection ratio change of an organic dye-based recording material. In this optical recording medium, a wobbling groove is formed along the recording track, the recording track has a track pitch of 1.3 micrometers or below, and the recording material contains at least one of compounds shown in Chemical Formula 5 to 7 below:

[Chemical Formula 5]

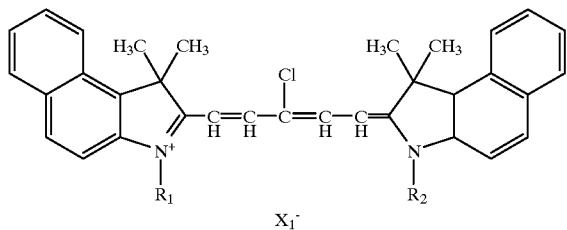

wherein $R_1$ and $R_2$ are alkyl groups selected from a group consisting of n-$C_4H_9$, n-$C_3H_7$, and n-$C_5H_{11}$, and $X_1^-$ is an anion;

[Chemical Formula 6]

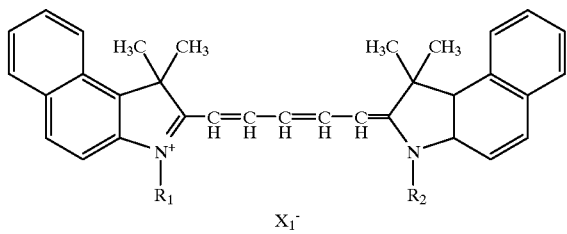

wherein $R_1$ and $R_2$ are alkyl groups selected from a group consisting of n-$C_4H_9$, n-$C_3H_7$, and n-$C_5H_{11}$, and $X_1^-$ is an anion;

[Chemical Formula 7]

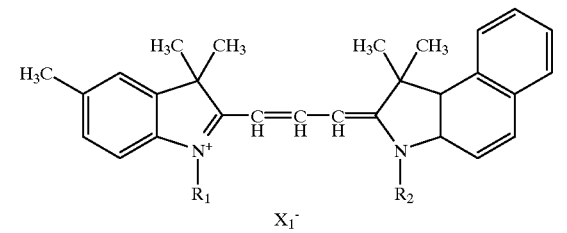

wherein $R_1$ and $R_2$ are alkyl groups selected from a group consisting of n-$C_4H_9$, n-$C_3H_7$, and n-$C_5H_{11}$, and $X_1^-$ is an anion.

Alternatively, in the optical recording medium according to the present invention, a wobbling groove is formed along a recording track, the recording track has a track pitch of 1.3 micrometers or below, and the recording material contains a compound shown in Chemical Formula 8 below:

[Chemical Formula 8]

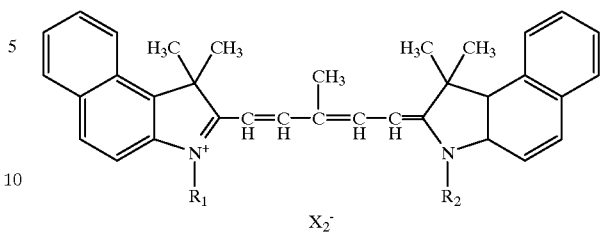

wherein $R_1$ and $R_2$ are alkyl groups selected from a group consisting of n-$C_4H_9$, n-$C_3H_7$, and n-$C_5H_{11}$, and $X_2^-$ is an anion (excluding $ClO_4^-$)

In the optical recording medium according to the present invention uses the material containing the compounds shown in the aforementioned Chemical Formulae 5 to 8 and accordingly, even when the track pitch is reduced to 1.3 micrometers or below, it is possible to suppress the jitter component of the wobble signal required for recording/reproducing to a sufficiently low value for practical use. Consequently, in this optical recording medium, it is possible to realize a high recording density while obtaining stable recording/reproducing of information.

DETAILED DESCRIPTION OF PREFERRED EMBODIMENTS

Description will now be directed to an embodiment of the present invention with reference to the attached drawings. It should be noted that although explanation will be given on a case that the present invention is applied to a CD-R standardized as a write-once optical disc, the present invention is not to be limited to this case but can be widely applied to an optical recording medium having a wobbling groove formed along a recording track and a wobble signal from this wobbling groove is reproduced so that a signal is recorded as a reflection ration change of an organic dye-based recording material on the recording track.

Figure 1:
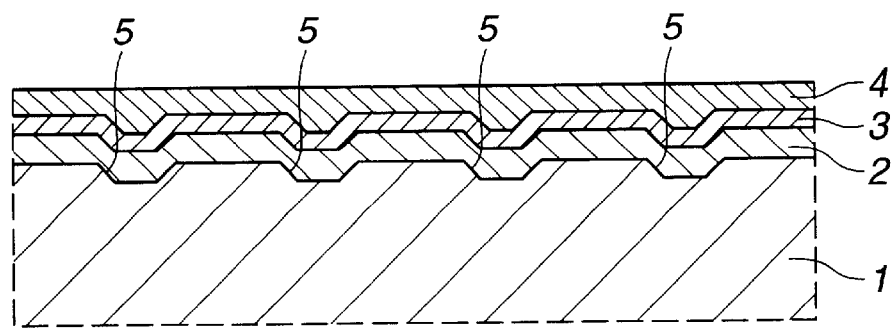
FIG. 1 is a cross sectional view of an essential portion of a CD-R according to the present invention.

FIG. 1 shows a cross sectional view showing an essential portion of the CD-R to which the present invention is applied. The CD-R includes a disc-shaped disc substrate 1 formed from polymethyl methacrylate (PMMA), polycarbonate (PC), or the like with a diameter of about 120 mm and a thickness of about 1.2 mm. On this disc substrate 1, a recording layer 2 is formed by spin-coating an organic dye-based recording material which will be detailed later. On this recording layer 2, for example, a gold (Au), a silver (Ag) film, or the like is formed as a reflection film 3, on which a protection layer 4 is formed by spin-coating, for example, an ultraviolet ray hardening resin or the like.

Figure 2:
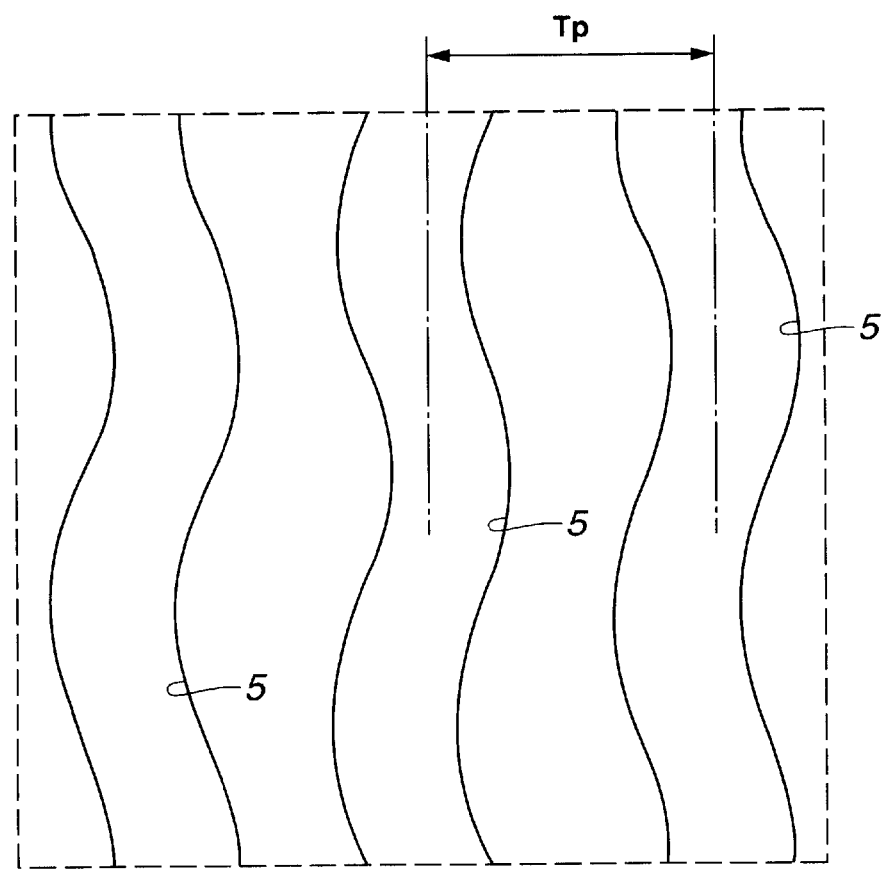
FIG. 2 is a plan view schematically showing an information recording region of the CD-R.

In this CD-R, a region of a diameter range 50 mm to 116 mm on the disc substrate 1 is set as an information recording area. At least in this information recording area, a wobbling groove 5 as a meandering guide groove is formed as shown in FIG. 2, in a spiral form, for example. A portion corresponding to the wobbling groove 5 of the recording layer 2 is set as a recording track, on which a signal subjected to EFM modulation (EFM signal) is recorded.

It should be noted that in the CD-R according to the present invention, the track pitch Tp as an interval between adjacent recording tracks is set not greater than 1.3 micrometers. That is, while the standardized existing CD-R has a track pitch of 1.6 micrometers and a recording capacity of about 650 MB (megabytes), the CD-R according to the present invention has a track pitch Tp reduced to 1.3 micrometers or below and by increasing the linear density (reducing the linear velocity) with the same ratio of the reduction of the track pitch Tp, a recording capacity of 1.0 GB or above can be realized.

Moreover, the wobbling groove 5 is formed to wobble with a predetermined cycle, with which a sector information containing FM-modulated absolute time information is recorded as an ATIP (absolute time in pregroove) wobble signal.

In the CD-R having the aforementioned configuration, the ATIP wobble signal from the wobbling groove 5 is reproduced to obtain the absolute time information while the EFM signal is recorded on the recording track as a reflection ratio change of the organic dye-based recording material constituting the recording layer 2.

By the way, in the CD-R according to the present invention, the recording material constituting the recording layer 2 is a material containing one of dyes shown in Chemical Formulae 9 to 12 below.

[Chemical Formula 9]

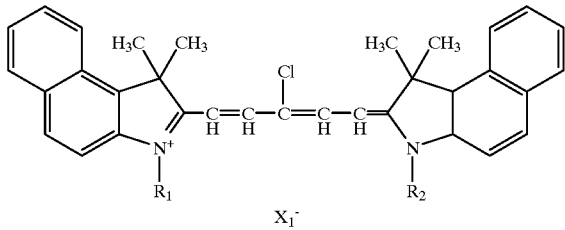

wherein $R_1$ and $R_2$ are alkyl groups selected from a group consisting of n-$C_4H_9$, n-$C_3H_7$, and n-$C_5H_{11}$, and $X_1^-$ is an anion.

[Chemical Formula 10]

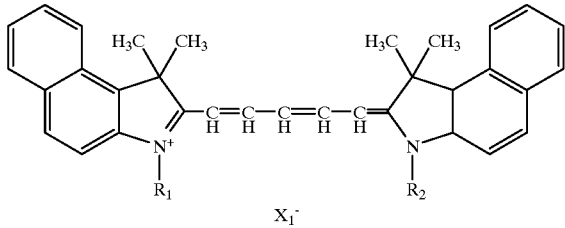

wherein $R_1$ and $R_2$ are alkyl groups selected from a group consisting of n-$C_4H_9$, n-$C_3H_7$, and n-$C_5H_{11}$, and $X_1^-$ is an anion.

[Chemical Formula 11]

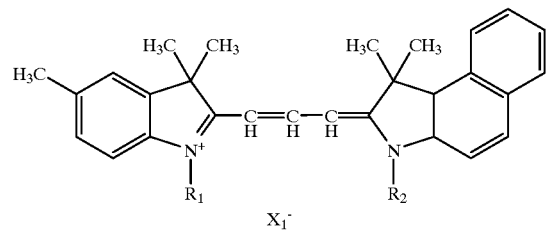

wherein $R_1$ and $R_2$ are alkyl groups selected from a group consisting of n-$C_4H_9$, n-$C_3H_7$, and n-$C_5H_{11}$, and $X_1^-$ is an anion.

It should be noted that as the anion $X_1^-$ serving as a counter ion, any anion can be selected. More specifically, there can be exemplified halogen anion, phosphor anion, and the like. Especially preferable are $PF_6^-$, $ClO_4^-$, $BF_4^-$, $I^-$, and the like.

[Chemical Formula 12]

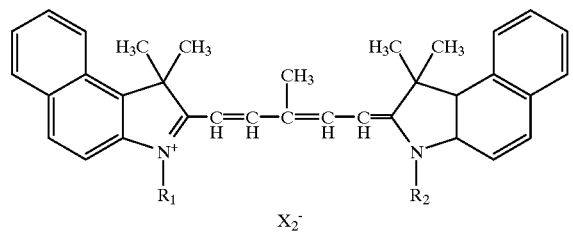

wherein $R_1$ and $R_2$ are alkyl groups selected from a group consisting of n-$C_4H_9$, n-$C_3H_7$, and n-$C_5H_{11}$, and $X_2^-$ is an anion (excluding $ClO_4^-$).

It should be noted that as the anion $X_2^-$ serving as a counter ion, any anion can be selected excluding $ClO_4^-$ because of the reason explained below.

Any element in a peroxy state causes a burning reaction. However, there exist some elements that are formed into a molecule (ionized) without exceeding the energy gap required for burning. $ClO_4^-$ is a representative example as the molecule (ionized) without exceeding the energy gap required for burning.

The atmosphere containing such molecules (ions) can be said to be under an environment easily causing burning. It is expected that a reaction accompanied by heat is violent as compared to other molecules (atoms, ions).

The aforementioned is the main reason why the thermal reaction is especially violent in the dye containing $ClO_4^-$.

When $ClO_4^-$ is selected as the counter ion in the dye shown in the aforementioned Chemical Formula 12, the thermal reaction becomes too violent, increasing the jitter component as a result. For this, in this invention, the aforementioned $ClO_4^-$ is excluded as the counter ion of the dye shown in Chemical Formula 12.

Accordingly, the counter ion of the dye shown in Chemical Formula 12 may be, for example, halogen anion, phosphor anion, and the like. Especially preferable are $PF_6^-$, $BF_4^-$, $I^-$, and the like.

When forming the recording layer 2 of the CD-R according to the present invention, firstly, the dyes shown in Chemical Formulae 9 to 12 are dissolved, for example, in tetrafluoropropanol to prepare a paint liquid (dye concentration 2.0 weight %). This paint liquid is applied by using a spinner onto the disc substrate 1 having the wobbling groove 5 in the information recording area. Thus, the recording layer 2 is formed from the organic dye-based recording material shown in Chemical Formulae 9 to 12.

In the CD-R according to the present invention, by using a material containing the dyes shown in Chemical Formulae 9 to 12 as the recording material constituting the recording layer 2, it is possible to reduce the track pitch Tp to 1.3 micrometers or below while suppressing the jitter component of the ATIP wobble signal from the wobbling groove 5 to a sufficiently low value for practical use and obtaining the absolute time information in a stable manner, enabling to perform a stable recording/reproducing of the EFM signal.

That is, in the CD-R recording/reproducing an EFM signal while reproducing the ATIP wobble signal from the wobbling groove 5 to obtain the absolute time information, when the track pitch Tp is reduced, a signal leak from the adjacent wobbling groove 5 is increased, which in turn increases the jitter component of the ATIP signal. When the jitter component of the ATIP wobble signal is increased, for example, to 10% or more with respect to the ATIP wobble signal clock, it becomes difficult to recognize the absolute time information in a stable manner, disabling to obtain a stable recording/reproducing of the EFM signal.

By the way, in the CD-R using an organic dye-based material, the jitter characteristic of the ATIP wobble signal greatly depends on the state of the organic dye-based material filled in the wobbling groove 5. In other words, the jitter characteristic of the ATIP wobble signal is greatly changed by the viscosity, wettability, and other characteristics of the paint liquid applied onto the disc substrate 1 when forming the recording layer 2.

Such viscosity and wettability of the paint liquid are determined by a characteristic inherent to the dye used. Accordingly, by constituting the recording material by using a dye having a characteristic appropriate to suppress the jitter component of the ATIP wobble signal to a low value, it is possible to reduce the track pitch Tp to 1.3 micrometers or below while suppressing the jitter component of the ATIP wobble signal, for example, to 10% or below with respect to the ATIP wobble signal clock so as to obtain the absolute time information in a stable manner, enabling to perform a stable recording/reproducing of the EFM signal.

The dyes show in the aforementioned Chemical Formulae 9 to 12 are dyes having a characteristic appropriate to suppress the jitter component of the ATIP wobble signal to a low value. Accordingly, in the CD-R having the recording layer 2 formed by the material containing the dyes shown in Chemical Formulae 9 to 12, even when the track pitch Tp is reduced to 1.3 micrometers or below, it is possible to suppress the jitter component of the ATIP wobble signal to 10% or below with respect to the ATIP wobble signal clock and to obtain the absolute time information in a stable manner, enabling to perform a stable recording/reproducing of the EFM signal.

Consequently, in the CD-R according to the present invention, it is possible to increase the recording density and to realize a recording capacity of 1.0 GB or above.

EXAMPLES

Hereinafter, explanation will be given on specific examples of the present invention based on experiment results.

<Experiment 1>

To confirm the effect of the present invention, we actually prepared a CD-R (Example 1) using as the recording material a material containing a dye shown in Chemical Formula 13 below, a CD-R (Example 2) using as the recording material a material containing a dye shown in Chemical Formula 14 below, and a CD-R (Example 3) using as the recording material a material containing a dye shown in Chemical Formula 15 below, and evaluated their ATIP wobble signal jitter characteristics.

[Chemical Formula 13]

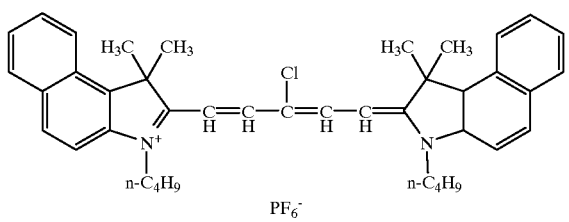

[Chemical Formula 14]

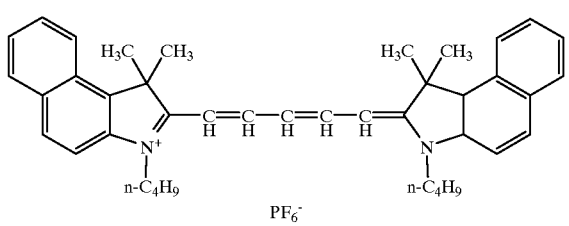

[Chemical Formula 15]

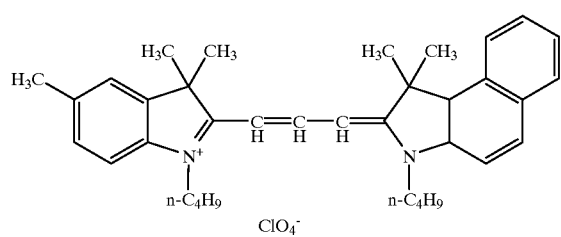

Moreover, for comparison, we prepared a CD-R (Comparative Example 1) using as the recording material a material containing a dye shown in Chemical Formula 16 below and a CD-R (Comparative Example 2) using as the recording material a material containing a dye shown in Chemical Formula 17 below, and evaluated their ATIP wobble signal jitter characteristics.

[Chemical Formula 16]

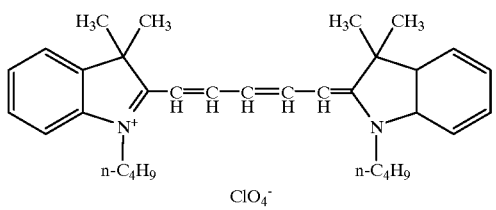

-continued

[Chemical Formula 17]

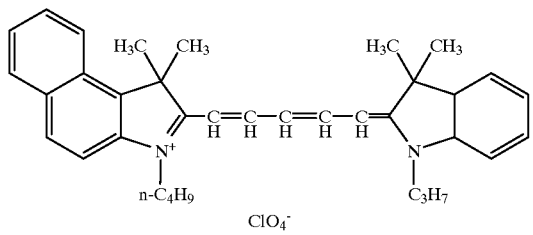

[Preparation of CD-R]

Firstly, by injection molding of polycarbonate, a disc substrate 1 was prepared with a diameter of about 120 mm and a thickness of about 1.2 mm. When performing the injection molding of the disc substrate 1, a stamper having a convex/concave pattern corresponding to the wobbling groove 5 was used to form the wobbling groove 5 in a spiral state on the disc substrate 1. This wobbling groove 5 was made to have the ATIP wobble signal.

Next, each of the dyes shown in the aforementioned Chemical Formulae 13 to 17 was dissolved in tetrafluoropropanol with concentration of 2.0 weight % to obtain 5 types of paint liquid. Each of the five paint liquids was applied to separate disc substrates 1 by using a spinner so as to form the recording layer 2.

Next, a thin silver film was formed by sputtering on each of the disc substrates 1 having recording layer 2 so as to form a reflection film 3 with a thickness of about 100 nm. Furthermore, an ultraviolet ray hardening resin was applied onto the reflection film 3 and hardened to form a protection layer 4 with a thickness of about 10 micrometers. Thus, five types of CD-R as Examples 1 to 3 and Comparative Examples 1 and 2 were complete.

In each of these CD-R, the track pitch was set to 1.10 micrometers and to have a recording capacity of 1.3 GB by performing recording/reproducing with a linear velocity of 0.90 m/s (linear density of 0.4 micrometers/bit).

[Evaluation of Recording/reproducing Characteristics]

A laser beam for reproduction was applied to each of the CD-R while being rotated with a linear velocity of 0.90 m/s so as to reproduce the ATIP wobbling signal. The reproduction laser beam had a wavelength of 780 nm and the optical system was set to numerical aperture (NA) of 0.55. Moreover, the power of the reproduction laser beam was set to 0.7 mW.

The jitter characteristic of the reproduced ATIP wobble signal was evaluated. For the jitter of the absolute time information contained in the ATIP wobble signal, in general, it is necessary that the jitter be equal to 10% or below with the clock of the ATIP wobble signal. Accordingly, the jitter characteristic of the ATIP wobble signal was evaluated whether the jitter component against the ATIP wobble signal clock (frequency 6.3 kHz) was suppressed to 10% or below. Table 1 shows the results.

TABLE 1

| | ATIP wobble signal jitter characteristic (%) |
|---|---|
| Examples 1 | 6.3 |
| Examples 2 | 6.6 |
| Examples 3 | 5.0 |

TABLE 1-continued

| | ATIP wobble signal jitter characteristic (%) |
|---|---|
| Comparative Examples 1 | 14.0 |
| Comparative Examples 2 | 21.0 |

Table 1 shows that in the CD-R of Comparative Examples 1 and 2, the jitter component ratio against the ATIP wobble signal clock by far exceeds 10% and stable reproduction of the ATIP wobble signal cannot be expected. The reasons is considered to be that the dyes shown in Chemical Formulae 16 and 17 and used as the recording material of the Comparative Examples 1 and 2 are not appropriate for the CD-R having a reduced track pitch. It should be noted that even when the dyes shown in Chemical Formulae 16 and 17 are used as the recording material, in the existing CD-R having a track pitch set to 1.6 micrometers, it is possible to suppress the jitter component ratio against the ATIP wobble signal clock to 10% or below.

As compared to the aforementioned, in the CD-R of Examples 1 to 3, the jitter component ratio against the ATIP wobble signal clock is suppressed to 10% or below, enabling to obtain a preferable jitter characteristic. This is because the dyes shown in Chemical Formulae 13 to 15 and used as the recording material of the CD-R of Examples 1 to 3 have characteristics appropriate to suppress the ATIP wobble signal jitter component to a low value.

Thus, in the CD-R of Examples 1 to 3 using as the recording material the dyes having characteristic appropriate for suppressing the ATIP wobble signal jitter component to a low value, even when the track pitch is reduced to 1.10 micrometers to increase the recording density, it is possible to obtain a preferable jitter characteristic of the ATIP wobble signal and to obtain the absolute time information in a stable manner, enabling to perform a stable recording/reproducing of the EFM signal.

[Study of Counter Ion]

Next, we prepared similar CD-R by using anions shown in Table 2 to replace the counter ion (anion $X_1^-$) in the dyes shown in Chemical Formulae 13 to 15 and measured the jitter characteristic at track pitch of 1.6 micrometers and 1.1 micrometers.

Table 2 shows the results.

TABLE 2

| | | Track pitch | |
|---|---|---|---|
| Dye | Anion | 1.6 micrometers | 1.1 micrometers |
| Chemical Formula 13 | $PF_6^-$ | 5.1 | 6.3 |
| | $I^-$ | 5.5 | 6.7 |
| | $BF_4^-$ | 4.2 | 5.9 |
| | $ClO_4^-$ | 5.0 | 5.9 |
| | $SbF_6^-$ | 6.1 | 8.2 |
| Chemical Formula 14 | $PF_6^-$ | 4.7 | 6.6 |
| | $I^-$ | 4.4 | 6.4 |
| | $BF_4^-$ | 5.0 | 6.6 |
| | $ClO_4^-$ | 6.3 | 9.5 |
| Chemical Formula 15 | $PF_6^-$ | 4.3 | 5.1 |
| | $I^-$ | 4.0 | 5.2 |
| | $BF_4^-$ | 4.4 | 5.1 |
| | $ClO_4^-$ | 4.1 | 5.0 |

When the dyes shown in Chemical Formulae 13 to 15 are used, regardless of the counter ion type, the jitter component ratio against the ATIP wobble signal clock can be suppressed to 10% or below in both of the track pitch values 1.6 micrometers and 1.1 micrometers.

<Experiment 2>

Next, we prepared a CD-R (Example 4) using as the recording material a material containing a dye shown in Chemical Formula 18 below and evaluated the ATIP wobble signal jitter characteristic.

[Chemical Formula 18]

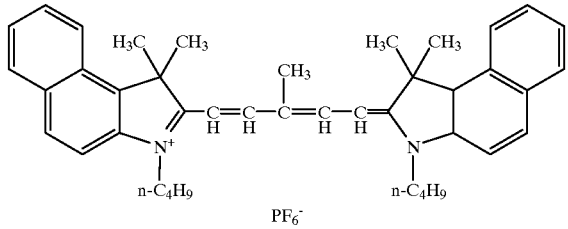

Moreover, for comparison, we prepared a CD-R (Comparative Example 3) using as the recording material a material containing a dye shown in Chemical Formula 19 below, a CD-R (Comparative Example 4) using as the recording material a material containing a dye shown in Chemical Formula 20 below, and a CD-R (Comparative Example 5) using as the recording material a material containing a dye shown in Chemical Formula 21 below, and evaluated their ATIP wobble signal jitter characteristic.

[Chemical Formula 19]

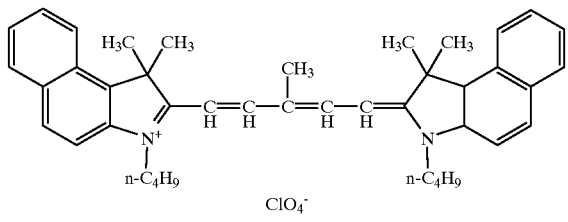

[Chemical Formula 20]

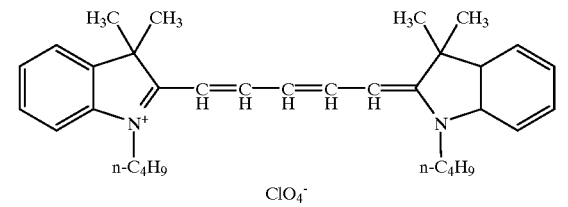

[Chemical Formula 21]

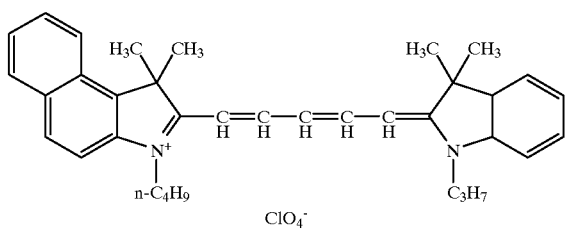

[Preparation of CD-R]

Firstly, by injection molding of polycarbonate, a disc substrate 1 was prepared with a diameter of about 120 mm and a thickness of about 1.2 mm. When performing the injection molding of the disc substrate 1, a stamper having a convex/concave pattern corresponding to the wobbling groove 5 was used to form the wobbling groove 5 in a spiral state on the disc substrate 1. This wobbling groove 5 was made to have the ATIP wobble signal.

Next, each of the dyes shown in the aforementioned Chemical Formulae 18 to 21 was dissolved in tetrafluoropropanol with concentration of 2.0 weight % to obtain 4 types of paint liquid. Each of the four paint liquids was applied to separate disc substrates 1 by using a spinner so as to form the recording layer 2.

Next, a thin silver film was formed by sputtering on each of the disc substrates 1 having recording layer 2 so as to form a reflection film 3 with a thickness of about 100 nm. Furthermore, an ultraviolet ray hardening resin was applied onto the reflection film 3 and hardened to form a protection layer 4 with a thickness of about 10 micrometers. Thus, four types of CD-R as Example 4 and Comparative Examples 3 to 5 were complete.

In each of these CD-R, the track pitch was set to 1.10 micrometers and to have a recording capacity of 1.3 GB by performing recording/reproducing with a linear velocity of 0.90 m/s (linear density of 0.4 micrometers/bit).

[Evaluation of Recording/reproducing Characteristics]

A laser beam for reproduction was applied to each of the CD-R while being rotated with a linear velocity of 0.90 m/s so as to reproduce the ATIP wobbling signal. The reproduction laser beam had a wavelength of 780 nm and the optical system was set to numerical aperture (NA) of 0.55. Moreover, the power of the reproduction laser beam was set to 0.7 mW.

The jitter characteristic of the reproduced ATIP wobble signal was evaluated. For the jitter of the absolute time information contained in the ATIP wobble signal, in general, it is necessary that the jitter be equal to 10% or below with the clock of the ATIP wobble signal. Accordingly, the jitter characteristic of the ATIP wobble signal was evaluated whether the jitter component against the ATIP wobble signal clock (frequency 6.3 kHz) was suppressed to 10% or below. Table 3 shows the results.

TABLE 3

| | ATIP wobble signal jitter characteristic (%) |
|---|---|
| Examples 4 | 9.4 |
| Comparative Examples 3 | 16.9 |
| Comparative Examples 4 | 14.0 |
| Comparative Examples 5 | 20.1 |

Table 3 shows that in the CD-R of Comparative Examples 3 to 5, the jitter component ratio against the ATIP wobble signal clock by far exceeds 10% and stable reproduction of the ATIP wobble signal cannot be expected.

The reasons is considered to be that the dyes shown in Chemical Formulae 19 to 21 and used as the recording material of the Comparative Examples 3 to 5 are not appropriate for the CD-R having a reduced track pitch.

Especially in Comparative Example 3, although using the same dye as in Example 4, the jitter component ratio was increased because the counter ion was $ClO_4^-$.

It should be noted that even when the dyes shown in Chemical Formulae 19 to 21 are used as the recording material, in the existing CD-R having a track pitch set to 1.6 micrometers, it is possible to suppress the jitter component ratio against the ATIP wobble signal clock to 10% or below.

As compared to the aforementioned, in the CD-R of Examples 4, the jitter component ratio against the ATIP wobble signal clock is suppressed to 10% or below, enabling to obtain a preferable jitter characteristic. This is because the dyes shown in Chemical Formulae 18 and used as the recording material of the CD-R of Example 4 has characteristics appropriate to suppress the ATIP wobble signal jitter component to a low value.

Thus, in the CD-R of Example 4 using as the recording material the dyes having characteristic appropriate for suppressing the ATIP wobble signal jitter component to a low value, even when the track pitch is reduced to 1.10 micrometers to increase the recording density, it is possible to obtain a preferable jitter characteristic of the ATIP wobble signal and to obtain the absolute time information in a stable manner, enabling to perform a stable recording/reproducing of the EFM signal.

[Study of Counter Ion]

Next, we prepared similar CD-R by using anions shown in Table 4 to replace the counter ion (anion $X_2^-$) in the dyes shown in Chemical Formula 18 and measured the jitter characteristic at track pitch of 1.6 micrometers and 1.1 micrometers.

Table 4 shows the results.

TABLE 4

| Dye | Anion | Track pitch | |
| --- | --- | --- | --- |
| | | 1.6 micrometers | 1.1 micrometers |
| Chemical Formula 18 | $PF_6^-$ | 5.3 | 9.4 |
| | $I^-$ | 4.8 | 6.4 |
| | $BF_4^-$ | 5.3 | 7.1 |

When the dye shown in Chemical Formula 18 is used, regardless of the counter ion type, excluding the counter ion $ClO_4^-$, the jitter component ratio against the ATIP wobble signal clock can be suppressed to 10% or below in both of the track pitch values 1.6 micrometers and 1.1 micrometers.

As has been detailed above, in the optical recording medium according to the present invention, even when the track pitch is reduced to 1.3 micrometers or below, it is possible to suppress the jitter component of the wobble signal required for recording/reproducing to a sufficiently low value for practical use. Accordingly, in this optical recording medium, it is possible to realize a high recording density while assuring a stable recording/reproducing of information.

What is claim is:

1. An optical recording medium having a recording track in which a signal is recorded as a reflection ratio change of an organic dye-based recording material, wherein a wobbling groove is formed along the recording track, the recording track has a track pitch of 1.3 micrometers or below, the optical recording medium is a CD-R disc;

a laser beam for reproduction of data from said optical recording medium has a wavelength of 780 nm; and the recording material contains at least one of compounds shown in Chemical Formulae 1 to 3 below:

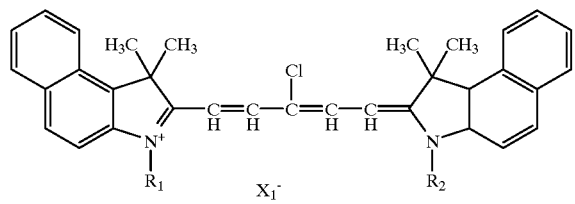

[Chemical Formula 1]

wherein $R_1$ and $R_2$ are alkyl groups selected from a group consisting of $n-C_4H_9$, $n-C_3H_7$, and $n-C_5H_{11}$, and $X_1$ is an anion;

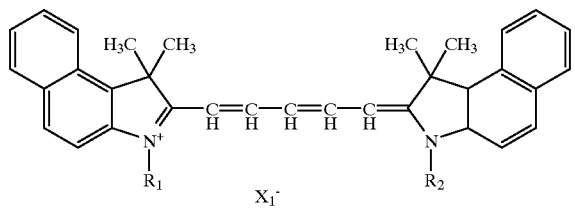

[Chemical Formula 2]

wherein $R_1$ and $R_2$ are alkyl groups selected from a group consisting of $n-C_4H_9$, $n-C_3H_7$, and $n-C_5H_{11}$, and $X_1$ is an anion;

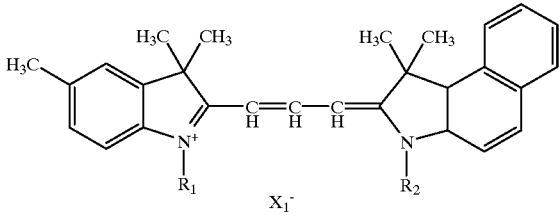

[Chemical Formula 3]

wherein $R_1$ and $R_2$ are alkyl groups selected from a group consisting of $n-C_4H_9$, $n-C_3H_7$, and $n-C_5H_{11}$, and $X_1$ is an anion.

2. An optical recording medium having a recording track in which a signal is recorded as a reflection ratio change of an organic dye-based recording material, wherein a wobbling groove is formed along the recording track, the recording track has a track pitch of 1.3 micrometers or below, the optical recording medium is a CD-R disc;

a laser beam for reproduction of data from said optical recording medium has a wavelength of 780 nm; and the recording material contains at least one of compounds shown in Chemical Formula 4 below:

[Chemical Formula 4]

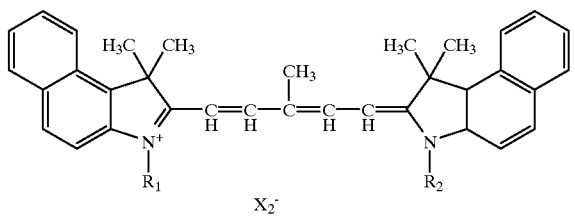

wherein $R_1$ and $R_2$ are alkyl groups selected from a group consisting of n-$C_4H_9$, n-$C_3H_7$, and n-$C_5H_{11}$, and $X_2$ is an anion (excluding $ClO_4$).

3. The optical recording medium as claimed in claim 2, wherein the anion $X_2^-$ is one selected from a group consisting of $PF_6^-$, $BF_4^-$, and $I^-$.

4. The optical recording medium as claimed in one of claims 1 and 2, wherein the signal recorded in the recording track is a signal which has been subjected to EFM modulation and the wobble signal is a signal containing an absolute time information FM-modulated or a signal containing an address information.

5. The optical recording medium as claimed in claim 4, wherein the time information obtained from the wobble signal has a jitter component of 10% or below.

6. The optical recording medium as claimed in one of claims 1 and 2, the medium having an information capacity of 1.0 GB or above while maintaining the CD format.

* * * * *